(12) United States Patent
Grundler et al.

(10) Patent No.: US 10,655,727 B2
(45) Date of Patent: May 19, 2020

(54) LUBRICATING DEVICE FOR A TRANSMISSION, AND TRANSMISSION COMPRISING SAID LUBRICATING DEVICE

(71) Applicant: ZF Friedrichshafen AG, Friedrichshafen (DE)

(72) Inventors: Rainer Grundler, Bodman-Ludwigshafen (DE); Markus Herrmann, Scheidegg (DE); Thilo Schmidt, Meckenbeuren (DE); Dietmar Gehring, Aichstetten (DE); Dirk Winkler, Kressbronn (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 304 days.

(21) Appl. No.: 15/760,826

(22) PCT Filed: Aug. 24, 2016

(86) PCT No.: PCT/EP2016/069932
§ 371 (c)(1),
(2) Date: Mar. 16, 2018

(87) PCT Pub. No.: WO2017/045881
PCT Pub. Date: Mar. 23, 2017

(65) Prior Publication Data
US 2018/0266539 A1    Sep. 20, 2018

(30) Foreign Application Priority Data

Sep. 17, 2015    (DE) .......................... 10 2015 217 893

(51) Int. Cl.
*F16H 57/04*    (2010.01)
(52) U.S. Cl.
CPC ....... *F16H 57/0427* (2013.01); *F16H 57/043* (2013.01)

(58) Field of Classification Search
CPC .......................... F16H 57/0427; F16H 57/043
(Continued)

(56) References Cited

U.S. PATENT DOCUMENTS

| 3,539,035 A | 11/1970 | Wolkenstein |
| 4,026,386 A | 5/1977 | Therkildsen |

(Continued)

FOREIGN PATENT DOCUMENTS

| DE | 1985822 U | 5/1968 |
| DE | 1650681 | 11/1970 |

(Continued)

OTHER PUBLICATIONS

German Search Report DE102015217893.5, dated May 6, 2016. (5 pages).

(Continued)

*Primary Examiner* — Michael R Mansen
*Assistant Examiner* — Mark K Buse
(74) *Attorney, Agent, or Firm* — Dority & Manning, P.A.

(57) ABSTRACT

A greaser for a transmission includes a shaft (1) having an axial bore (3) and a plurality of axially spaced radial bores (6a, 6b, 6c). Each of at least one tube (8a, 8b) is inserted into a respective one of the axially spaced radial bores (6a, 6b) and extends radially inwardly into the axial bore (3) beyond a circumferential surface (4) of the axial bore (3) that is adjacent the respective one of the axially spaced radial bores (6a, 6b). Each of the at least one tube (8a, 8b) includes a slot (11a, 11b) at a tube end (10a, 10b) facing a central axis (2) of the shaft (1). The slot (11a, 11b) of each of the at least one tube (8a, 8b) extends along a central axis (9a, 9b) of the respective tube (8a, 8b) into an interior space of the axial bore (3).

17 Claims, 1 Drawing Sheet

(58) Field of Classification Search
USPC ........................................................ 184/6.12
See application file for complete search history.

(56) References Cited

U.S. PATENT DOCUMENTS

| | | | |
|---|---|---|---|
| 2007/0137920 A1* | 6/2007 | Nakamura | F16H 57/0421 180/339 |
| 2010/0218635 A1* | 9/2010 | Matsumoto | F16H 57/043 74/473.36 |
| 2015/0078689 A1* | 3/2015 | Sieveking | F16C 33/1085 384/289 |
| 2015/0267804 A1* | 9/2015 | Carlino | F16H 57/043 475/159 |

FOREIGN PATENT DOCUMENTS

| | | |
|---|---|---|
| DE | 4117409 A1 | 12/1992 |
| DE | 102005052449 A1 | 5/2007 |
| JP | 2013024336 A | 2/2013 |

OTHER PUBLICATIONS

International Search Report (English Translation) PCT/EP2016/069932, dated Oct. 26, 2016. (2 pages).

\* cited by examiner

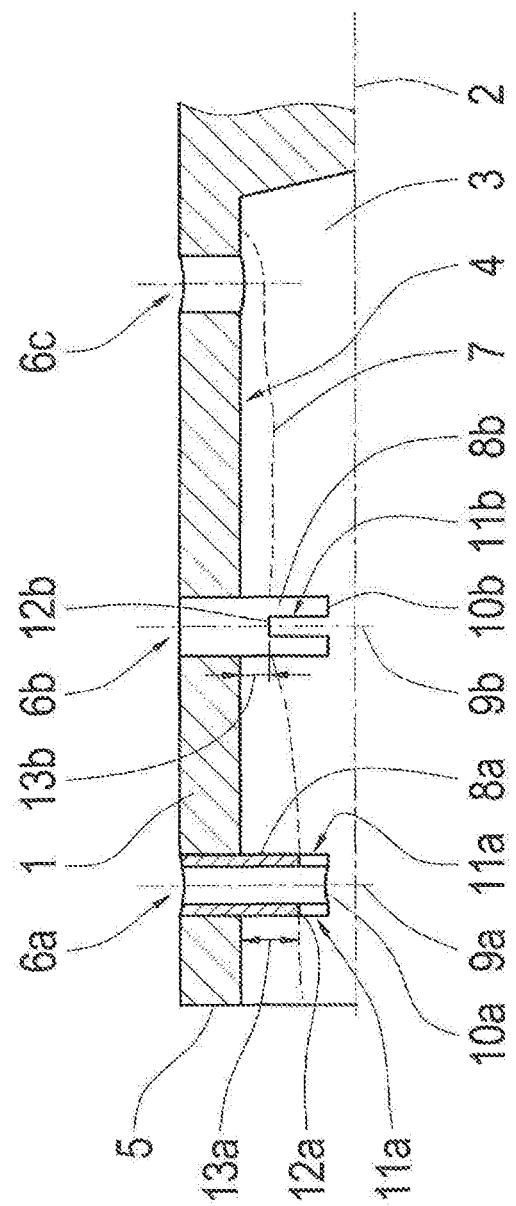

LUBRICATING DEVICE FOR A TRANSMISSION, AND TRANSMISSION COMPRISING SAID LUBRICATING DEVICE

FIELD OF THE INVENTION

The present invention relates generally to a greaser for a transmission. The invention further relates to a transmission with the greaser.

BACKGROUND

In the case of vehicle transmissions, the oiling of gears and bearings is of particular significance. Sufficient oiling should be ensured, and the amount of oil required for lubrication and cooling should be kept as low as possible. From the prior art it is known to utilize different oil pumps, hollow shafts, and oil lines for oiling. It is also known to utilize oil dams, oil ducts, and/or elevated oil levels in the transmission.

DE 41 17 409 A1, for example, describes a shaft having a central axial bore and a multitude of radial bores opening into this central bore, in the case of which lubricant from one shaft end of the hollow shaft is introduced into the central bore in the form of a longitudinal duct and this lubricant is transferred via the radial bores, in the form of radial ducts, to components arranged outside the hollow shaft. In this case, it is provided that a hollow adapter sleeve is inserted into at least that radial bore that is situated closest to the open shaft end of the hollow shaft and projects, via its end facing the hollow-shaft central axis, beyond the circumferential surface of the central bore, i.e., extends beyond the circumferential surface of the central bore into the central bore. This measure causes a hindrance to the lubricant outflow at this radial duct, and therefore the lubricant, which has been axially introduced into the central bore and, as is known, does not reach the rotational speed or the circumferential speed of the hollow shaft quickly enough, no longer flows out to an increased extent at this radial bore situated closest to the inflow point. Further radial ducts can also be formed so as to overhang into the longitudinal duct, wherein it is advantageous for a uniform distribution of lubricant when the overhang is designed to decrease starting from the open shaft end.

DE 10 2005 052 449 A1 describes a further shaft having a central axial bore and a multitude of radial bores opening into this central bore, in the case of which lubricant from one shaft end of the hollow shaft is introduced into the central bore in the form of a longitudinal duct and this lubricant is transferred via the radial bores, in the form of radial ducts, to components arranged outside the hollow shaft. In order to avoid the situation in which too much oil exits from the radial bores of the internally oiled hollow shaft, which can occur, for example, when the oil level in the shaft rises sharply, an insert tube is inserted into each of the radial bores in order to adjust the flow discharged via the radial bores, the insert tube extending beyond the circumferential surface of the central bore into the central bore. In this way, the flow that is flowing out via the particular insert tube can be adjusted by way of the distance of the end of this insert tube facing the center of the hollow shaft to the oil level which is becoming established, under speed, in the central bore of the hollow shaft. In addition, at least one small radial bore can be provided in the insert tube, in order to materialize, in this way, a further possibility for controlling or adjusting the flow.

SUMMARY OF THE INVENTION

The present invention provides a greaser which can be manufactured comparatively cost-effectively relative to known greasers. The greaser includes a shaft having an axial bore and multiple radial bores, in the case of which a flow fed to this axial bore is discharged in a uniformly distributed manner via the multiple axially spaced radial bores.

The invention is based on the finding that lubricant, which is introduced into a central bore of a rotating shaft and, from there, is discharged again via multiple, axially mutually spaced radial bores which open into this central bore, forms a more or less thick oil level on the circumferential surface of the central bore due to the centrifugal force, which oil level becomes thinner as the length of the central bore increases. As a consequence thereof, the radial bore situated furthest from the inlet point of the lubricant is the most poorly supplied with lubricant, while there tends to be excess lubricant at the radial bore situated closest to the inlet point of the lubricant.

Thus, a greaser for a transmission is provided, which includes a shaft having an axial bore and multiple axially spaced radial bores, wherein these radial bores open into this axial bore and transfer lubricant, which is fed to this axial bore, to components arranged outside the shaft. In this case, a tube is inserted into at least one of the radial bores, The tube extends radially inwardly, beyond the circumferential surface of the axial bore present in the area of this radial bore, into the axial bore.

According to the invention, in order to adjust the flow that is flowing out via the radial bores, it is provided that each of the tubes includes a slot on its tube end facing a central axis of the shaft, which slot extends, in the interior space of the axial bore, along a central axis of the particular tube. Preferably, the slot intersects the central axis of the tube in this case.

Due to the slot geometry, the amount of lubricant fed via the shaft to the components arranged outside the shaft is limited to a predefined maximum value. In addition, by way of a slot geometry that is individual for each tube, the amount of lubricant can be adjusted exactly to the level that is required at the individual lubrication point supplied by the particular tube. By way of the position and the geometry of the slots, an oil level in the shaft can therefore be structurally adjusted at each tube, which oil level flows past this tube and, therefore, is available to consumers arranged downstream in the direction of flow. In addition, due to the design according to the invention, the situation is avoided in which too much lubricant exits from the radial bores of the shaft, which can be the case according to the prior art when the oil level in the shaft rises sharply, for example when no further component must be supplied with lubricant via the shaft.

Within the scope of one particularly advantageous embodiment of the invention, it is therefore provided that the overall flow that is flowing out via the radial bores is adjusted in a defined manner via the slot cross section of the slots provided in the tubes. In this case, it can also be provided that the flow that is flowing out individually via each tube is adjusted in an individually defined manner via the slot cross section of the slot provided in this particular tube, for example by way of multiple tubes being provided with a different slot cross section. In this case, it is advantageous when the slot cross section of the slots provided in the tubes increases as viewed in the axial direction, starting from the slot situated closest to the open shaft end of the shaft at which the lubricant is fed to the axial bore.

Within the scope of another—alternative or supplementary—advantageous embodiment of the invention, it is provided that the overall flow that is flowing out via the radial bores is adjusted in a defined manner via the distance of the circumferential surface of the axial bore of the shaft to the slot bottom of the slots provided in the tubes. The inlet edge of the slot close to the circumferential surface forms the slot bottom in this case. In this case, it can also be provided that the flow that is flowing out individually via each tube is adjusted in an individually defined manner via the distance of the circumferential surface of the axial bore of the shaft present in the area of this tube to the slot bottom of the slot provided in this tube, for example in that multiple tubes are provided with a different distance of the circumferential surface of the axial bore to the slot bottom. In this case, it is advantageous when the distance of the circumferential surface of the axial bore to the slot bottom decreases as viewed in the axial direction, starting from the slot situated closest to the open shaft end of the shaft at which the lubricant is fed to the axial bore.

The tubes including the slots can be manufactured easily and cost-effectively. Depending on the application and the configuration of the shaft, the same tool can be utilized for all radial bores of the shaft. Due to the tubes inserted into the bores, the situation is also avoided in which these bores are designed with small dimensions, which would disadvantageously result in high production costs, as is known. The insertion of the tubes into the radial bores of the shaft is a proven technology, for example by means of pressing in, including subsequent staking, if necessary.

In one refinement of the invention, it is provided that the tubes are designed to be splined in a manner having favorable flow characteristics with respect to the inflow direction of the lubricant into the axial bore, and therefore the flow losses in the axial bore of the shaft are minimized.

In yet another refinement of the invention, it is provided that the slot of at least one of the tubes is aligned along the central axis of the shaft, which facilitates the feed of the lubricant into the tubes. It can also be provided, however, that the slot of at least one of the tubes is aligned crosswise or at a defined pitch with respect to the central axis of the shaft, in order to prevent contaminants from entering the tube.

BRIEF DESCRIPTION OF THE DRAWINGS

The invention is explained in greater detail in the following, by way of example, on the basis of the attached FIGURE.

FIG. 1 shows a schematic cutaway view of one exemplary embodiment of the invention as well as a detailed view of an insert tube arranged in a radial bore.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a sectional cross-section of a rotary shaft 1 for a transmission (not represented in greater detail in FIG. 1), which includes, along its central axis 2, an axial bore 2 designed as a blind hole, by way of example, and includes, by way of example, three axially mutually spaced radial bores 6a, 6b and 6c, all of which open into this axial bore 2. The circumferential surface of the axial bore 2, into which the individual radial bores 6 open, is marked thus: 4. The open shaft end of the shaft 1, at which the axial bore 2 is machined into the shaft 1, is marked thus: 5. The radial bores 6a, 6b, 6c are utilized for transferring lubricant, which is introduced, at the open shaft end 5 of the shaft 1, into the axial bore 2 of the shaft, to components (not represented in greater detail in FIG. 1) of the transmission arranged outside the shaft 1. If the shaft 1 rotates about its central axis 2, an oil level 7 becomes established in the axial bore 3 between the circumferential surface 4 and the central axis 2, which is dependent upon the shaft speed, the amount of lubricant supplied, and the amount of lubricant that flows out.

In one exemplary embodiment which is an alternative to FIG. 1, the axial bore of the shaft can also be designed as a stepped bore, and therefore various circumferential surfaces result in the area of the points of entry of the radial bores into the axial bore.

In the exemplary embodiment represented in FIG. 1, a tube 8a, 8b has been inserted into each of the two radial bores 6a, 6b, respectively, situated closest to the open shaft end 5 of the shaft 1, and therefore the lubricant discharged via these two radial bores 6a, 6b must traverse the interior space of these tubes 8a, 8b. The central axis of the tube 8a is marked thus: 9a. The central axis of the tube 8b is marked thus: 9b. In one exemplary embodiment which is an alternative to FIG. 1, a tube can also be inserted in the third radial bore 6c. In the exemplary embodiment represented in FIG. 1, the tubes 8a, 8b have a circular cross section, although, as an alternative, the tubes can also be designed to be splined in a manner having favorable flow characteristics with respect to the inflow direction of the lubricant into the axial bore 3, in order to minimize the flow losses in the axial bore 3 of the shaft 1.

In any case, the tubes 8a, 8b are inserted into the radial bores 6a, 6b in such a way that the tubes remain fixed in the radial bores 6a, 6b, in particular during the maximum operating speed of the shaft 1 and in the entire operating temperature range. Common methods therefor are, for example, pressing in, welding in, adhesively bonding in, or screwing in. In the installed state, the tube ends 10a and 10b of the tubes 8a and 8b facing the central axis 2 of the shaft 1 extend into the interior space of the axial bore 3 of the shaft 1, and therefore a defined distance exists between the outer surface 4 of the axial bore 3 present in the area of that radial bore 6a, 6b into which the particular tube 8a, 8b is inserted, and the particular tube end 10a, 10b. All tubes 8a, 8b have the same length in this case.

In order to adjust the lubricant flow that is flowing out via the radial bores 6a, 6b, 6c, a slot 11a is provided in the tube 8a at its tube end 10a which faces the central axis 2 of the shaft 1, transversally with respect to the central axis 9a of the tube 8a, which slot extends, in the interior space of the axial bore 2 of the shaft 1, along the central axis 9a of the tube 8a, while a slot 11b is provided in the tube 8b at its tube end 10b which faces the central axis 2 of the shaft 1, transversally with respect to the central axis 9b of the tube 8b, which slot extends, in the interior space of the axial bore 2 of the shaft 1, along the central axis 9b of the tube 8b. In this case, the slot 11a intersects the central axis 9a of the tube 8a, while the slot 11b intersects the central axis 9b of the tube 8b, and therefore the manufacture of the tubes 8a, 8b is advantageously simplified. The slot bottom of the slot 11a is marked thus: 12a. The distance from the slot bottom 11a to the circumferential surface 4 of the axial bore 3 is marked thus: 13a. The slot bottom of the slot 11b is marked thus: 12b. The distance from the slot bottom 11b to the circumferential surface 4 of the axial bore 3 is marked thus: 13b.

In FIG. 1, the slots 11a, 11b are differently aligned, by way of example. In the case of the tube 8a situated closest to the open shaft end 5, the slot 11a in the tube is aligned along the central axis 2 of the shaft 1, while, in the case of the other tube 8b, the slot 11b in the tube is aligned crosswise with respect to the central axis 2 of the shaft 1.

The individual slot geometry limits the amount of lubricant flowing out via the particular tube 8a, 8b to a predefined maximum value. In the exemplary embodiment represented in FIG. 1, the distance 13a, i.e., indirectly the depth or the axial extension of the slot 11a along the central axis 9a of the tube 8a, determines the amount of lubricating oil flowing out via this tube 8a, while the distance 13b, i.e., indirectly the depth or the axial extension of the slot 11b along the central axis 9b of the tube 8b, determines the amount of lubricating oil flowing out via this tube 8b. In the exemplary embodiment represented in FIG. 1, the distance 13a, 13b is different for the two tubes 8a, 8b. Specifically, the distance 13a at the tube 8a situated closest to the open shaft end 5 is greater than the distance 13b at the other tube 8b, and therefore the trace of the oil level 7 represented in FIG. 1 becomes established during rotation of the shaft 1.

Due to the position and the geometry of the slots, a defined oil level 7 is therefore structurally established in the shaft 1 at each of the tubes 8a, 8b, which oil level flows past this tube and, therefore, is available to consumers arranged downstream in the direction of flow. This slot geometry, which is individual for each tube, therefore makes it possible for precisely that amount of lubricant that is individually required to be fed to each of the lubrication points outside the shaft 1 that are supplied with lubricant via the shaft 1. In particular, the situation is also avoided, in which an excess amount of lubricant is discharged at the radial bore 6a of the shaft 1 situated closest to the open shaft end 5.

Modifications and variations can be made to the embodiments illustrated or described herein without departing from the scope and spirit of the invention as set forth in the appended claims.

REFERENCE CHARACTERS 1 shaft
2 central axis of the shaft
3 axial bore of the shaft
4 circumferential surface of the axial bore
5 open shaft end
6a, 6b, 6c radial bore of the shaft
7 oil level in the axial bore
8a, 8b tube
9a, 9b central axis of the tube
10a, 10b tube end
11a, 11b slot
12a, 12b slot bottom
13a, 13b distance

The invention claimed is:

1. A greaser for a transmission, comprising:
a shaft (1) having an axial bore (3) and a plurality of axially spaced radial bores (6a, 6b, 6c), the axially spaced radial bores (6a, 6b, 6c) opening into the axial bore (3), the axially spaced radial bores (6a, 6b, 6c) configured for transferring lubricant fed to the axial bore (3) to components arranged outside the shaft (1); and
at least one tube (8a, 8b), each of the at least one tube (8a, 8b) inserted into a respective one of the axially spaced radial bores (6a, 6b), each of the at least one tube (8a, 8b) extending radially inwardly into the axial bore (3) beyond a circumferential surface (4) of the axial bore (3) that is adjacent the respective one of the axially spaced radial bores (6a, 6b),
wherein, in order to adjust lubricant flow through the axially spaced radial bores (6a, 6b, 6c), each of the at least one tube (8a, 8b) comprises a slot (11a, 11b) at a tube end (10a, 10b) facing a central axis (2) of the shaft (1), the slot (11a, 11b) of each of the at least one tube (8a, 8b) extending along a central axis (9a, 9b) of the respective tube (8a, 8b) into an interior space of the axial bore (3).

2. The greaser of claim 1, wherein an overall lubricant flow out of the axially spaced radial bores (6a, 6b, 6c) is adjusted in a defined manner via a cross section of the slot (11a, 11b) in each of the at least one tube (8a, 8b).

3. The greaser of claim 2, wherein the cross section of the slot (11a, 11b) in multiple tubes (8a, 8b) of the at least one tube (8a, 8b) are different.

4. The greaser of claim 3, wherein the cross section of the slot (11a, 11b) in the multiple tubes (8a, 8b) increases along an axial direction starting from a slot (11a) positioned closest to an open end (5) of the shaft (1) at which the lubricant is fed to the axial bore (3).

5. The greaser of claim 1, wherein an individual lubricant flow from each of the at least one tube (8a, 8b) is adjusted in a defined manner via a cross section of the slot (11a, 11b) in each of the at least one tube (8a, 8b).

6. The greaser of claim 5, wherein the cross section of the slot (11a, 11b) in multiple tubes (8a, 8b) of the at least one tube (8a, 8b) are different.

7. The greaser of claim 6, wherein the cross section of the slot (11a, 11b) in the multiple tubes (8a, 8b) increases along an axial direction starting from a slot (11a) positioned closest to an open end (5) of the shaft (1) at which the lubricant is fed to the axial bore (3).

8. The greaser of claim 1, wherein an overall lubricant flow out of the axially spaced radial bores (6a, 6b, 6c) is adjusted in a defined manner via a distance (13a, 13b) between the circumferential surface (4) of the axial bore (3) to a bottom (12a, 12b) of the slot (11a, 11b) in each of the at least one tube (8a, 8b).

9. The greaser of claim 8, wherein the distance (13a, 13b) between the circumferential surface (4) of the axial bore (3) to the bottom (12a, 12b) of the slot (11a, 11b) in multiple tubes (8a, 8b) of the at least one tube (8a, 8b) are different.

10. The greaser of claim 9, wherein the distance (13a, 13b) between the circumferential surface (4) of the axial bore (3) to the bottom (12a, 12b) of the slot (11a, 11b) in the multiple tubes (8a, 8b) of the at least one tube (8a, 8b) decreases along an axial direction starting from a slot (11a) positioned closest to an open end (5) of the shaft (1) at which the lubricant is fed to the axial bore (3).

11. The greaser of claim 1, wherein individual lubricant flow that is from each of the at least one tube (8a, 8b) is adjusted in a defined manner via a distance (13a, 13b) between the circumferential surface (4) of the axial bore (3) adjacent the respective one of the axially spaced radial bores (6a, 6b) to a bottom (12a, 12b) of the slot (11a, 11b) in each of the at least one tube (8a, 8b).

12. The greaser of claim 11, wherein the distance (13a, 13b) between the circumferential surface (4) of the axial bore (3) to the bottom (12a, 12b) of the slot (11a, 11b) in multiple tubes (8a, 8b) of the at least one tube (8a, 8b) are different.

13. The greaser of claim 12, wherein the distance (13a, 13b) between the circumferential surface (4) of the axial bore (3) to the bottom (12a, 12b) of the slot (11a, 11b) in the multiple tubes (8a, 8b) of the at least one tube (8a, 8b) decreases along an axial direction starting from a slot (11a) positioned closest to an open end (5) of the shaft (1) at which the lubricant is fed to the axial bore (3).

14. The greaser of claim 1, wherein the at least one tube (8a, 8b) is splined along an inflow direction for the lubricant in the axial bore (3).

15. The greaser of claim 1, wherein the slot (11a) of one or more of the at least one tube (8a) is aligned along the central axis (2) of the shaft (1).

16. The greaser of claim 1, wherein the slot (11b) of one or more of the at least one tube (8b) is aligned crosswise or at a defined angle with respect to the central axis (2) of the shaft (1).

17. A transmission comprising the greaser of claim 1.

\* \* \* \* \*